Patented May 29, 1934

1,960,253

UNITED STATES PATENT OFFICE 1,960,253

ANTIFOULING, ANTICORROSIVE COATING COMPOSITION

John Mano, Flushing, N. Y., assignor to Hosnoler Corporation, New York, N. Y., a corporation of New York No Drawing. Application January 6, 1930, Serial No. 418,995

16 Claims. (Cl. 134—54)

This invention relates to anti-fouling, rust-proofing, anti-corrosive, acid-fume resisting and water repellant coating compositions, and is particularly applicable for the protection of surfaces immersed in or subjected to the action of sea water, and to the protection of metallic surfaces exposed to the corrosive action of the atmosphere, particularly when laden with acid or corrosive fumes.

My new composition comprises the following preferred ingredients by weight:

Lincman gum _____ 25 Parts
Mariola gum or rubber resins _____ 25 Parts
Elastica gum (caoutchouc) or any of its congeners _____ 25 Parts
Euphorbia or euphorbium coagulum or any of their congeners _____ 25 Parts
Lanolin _____ 15 to 35 Parts
Toxic _____ 1/10 percent to 5 percent
Solvents such as drip oil, carbon tetrachloride sufficient to thin to the proper consistency.

One of the principal ingredients of my improved composition is a gum which has been heretofore unknown and which has been named "Lincman" gum.

Lincman gum is a coined name for *Euphorbia lactea*, or the milky exudate of the plant native to Santo Domingo and identified by the specialists of the United States Department of Agriculture, Bureau of Plant Industry, early in the year 1929, as *Euphorbia lactea*, and is called by the natives, "Raquetta", and is also known as *Euphorbia antiquorum*. It is identified and described by Nathaniel Lord Britton in his work entitled "Flora of Bermuda", published by Charles Scribner & Sons, New York, in 1918, on page 219, as follows: *Euphorbia lactea haw;* mottled candlestick tree, East Indian, a fleshy nearly leafless plant 6'–12' high, the spreading 3-angled branches whitish or yellowish-blotched, knobby, with a short double spine on the end of each knob, is grown for interest in many gardens. Its copious sap is bright white." The exudate from this plant is freed from foreign material and coagulated.

The resulting product is a slightly grayish, firm, putty-like, though tough mass. It is insoluble in water, partly soluble in alcohol, acetone, and ether.

It is entirely soluble in benzol and its homologues, carbon tetrachloride, chloroform, carbon disulphide, or mixtures thereof.

I have found that after the gum had been allowed to stand for some length of time in alcohol, and the insoluble portion then removed by filtration, after which the alcohol is evaporated, it yielded, when dried, a transparent glossy, smooth to the touch, faintly brownish residuum of amorphous nature which can be scaled and powdered and in the nature of a resin. This extracted resin contains substances extremely bitter to the tongue, lips and throat, giving when tasted, an increasing sense of warmth. It is peppery, burning and smarting to the taste, much similar to capsicum. The sensation lasts for several hours, from which I conclude that the gum contains a substantial proportion of bitter principles.

It is probably for that reason that cattle do not eat it and that it is used by the natives as a hedge for fencing out goats, hogs and cattle. Lincman gum further contains, besides resin and bitter principles, a substantial amount of a colloid in the nature of rubber. I include it in my new composition to enable it to yield sufficiently under stress to resist the wearing action and friction of sea water under motion. The property of elasticity and yielding under action which would quickly destroy other paints may be aided by the other ingredients, as will be pointed out hereinafter, so that my composition is not removed by the friction of the water, as when it breaks against walls, piers, piling, under-sea machinery or construction and the like, coated thereby; nor is my improved paint likely to be rubbed or washed off for long periods when used on ship bottoms, buoys, and seaplane pontoons.

The substance known as Mariola gum consists of the resins extracted from rubber. It will be understood that hereinafter, where the term "Mariola gum" is used, I intend this term to apply to any resins or gum resins extracted from rubber, euphorbia, elastica, gutta percha, caoutchouc, balata, or any of their congeners. To replace the Mariola gum, however, I have found that any type of resin such as is suitable for use in varnish and paint bases, may be used, whether a true resin, an oil resin, or a drying oil, which when oxidized, acts substantially in the same manner as a resin.

Elastica gum (caoutchouc) is a well known product, being known as rubber gum but it will be understood that any of the congeners of rubber may be used to replace it such as gutta percha, balata, guayule, chicle and the like.

Euphorbium coagulum is a gum obtained from Africa, though any euphorbia or any of its congeners may be used instead. I prefer, however, to use the euphorbium coagulum for the reason that insofar as I can discover, no previous commercial use has been found for it, and it is available in large quantities at a comparatively low cost.

These four materials, or the Lincman gum and one or more of the others, may be mixed in either of two ways. One way consists of powdering the materials, mechanically mixing them and then dissolving them in a suitable solvent.

I have found that a mixture of these four materials gives the best result, since the various ingredients impart certain properties to the composition when combined, which properties are not inherent in the separate ingredients.

Another method of mixing the ingredients consists of powdering the materials so that they may pass through a 100-mesh screen, moistening the materials so mixed with a small amount of "drip oil" and then fusing the mixture until the excess moisture has been driven off and all solid particles are fused, so that the mixture changes from its light brown color to a black, pitch-like, glossy color. I prefer to use as little heat as possible during the fusing process to avoid too great a loss of the volatile constituents.

The drip oil to which I have referred above is sometimes termed "gas house liquor", gas oil", or "coal tar oil". It is a waste product, occurring during the process of the manufacture of illuminating gas, being rich in hydrocarbons such as benzol, naphthaline, aniline, and derivatives and homologues of these hydrocarbons. It may condense from illuminating gas at low temperatures or may come off therefrom as an oily distillate. For use in my composition, it is purified by the use of lime and alum. Nevertheless, it has an extremely unpleasant odor which I am able substantially to remove or neutralize in my composition by the use of carbon tetrachloride in connection with the drip oil.

I prefer to use carbon tetrachloride or drip oil as solvents, or a combination of one part of drip oil to three parts of carbon tetrachloride. The carbon tetrachloride being a comparatively expensive ingredient, the mixture thereof with drip oil lessens the cost while at the same time, the offensive odor of the drip oil is substantially neutralized. If a non-inflammable paint is desired, the carbon tetrachloride alone is used. The carbon tetrachloride and the drip oil may be replaced or used in connection with a great variety of other solvents such as carbon disulphide, chloroform, benzol and its homologues, aliphatic hydrocarbons and their derivatives, and aromatic hydrocarbons and their derivatives.

I prefer to add to the mixture or compound thus produced by fusion, about 15 to 35% by weight of lanolin, stirring the lanolin well into the fused compound while it is still hot so that the lanolin itself becomes fused and mixes intimately with the remainder of the compound. If my new composition is to be used on undersea concrete surfaces, I may use the larger percentage up to about 35% of lanolin. Well known dry powdered pigments such as lithopone, or lead, zinc, calcium, chromium, aluminum or other metal oxides, and more or less dessicated fillers of well known types may be incorporated, if desired, into the mixture, to give it more body, though such fillers and pigments may well be omitted, if desired. For thinning the product, I may use carbon tetrachloride only, particularly when it is desired to produce a non-inflammable paint. If the composition need not be non-inflammable, then the comparatively expensive carbon tetrachloride may be diluted with about one-third of drip oil, the carbon tetrachloride serving to neutralize the offensive odor of the drip oil. The mixture may be allowed to cool into a pasty or liquid consistency and is then ready for use.

If desired, the fused mixture of the Lincman gum, the Mariola gum, the caoutchouc, and the euphorbia or euphorbium coagulum may be allowed to solidify and then powdered to obtain a more intimate mixture before the lanolin and the solvent are added. In this case, my new composition may be sold in paste or powdered form and the diluent may be added just before use, or when desired.

The bitter principles of the Lincman gum, when absorbed by marine life, have the effect, I believe, of so weakening the marine growths and animals which otherwise would adhere to surfaces exposed to sea water, as to prevent them from retaining their hold thereon.

For the use of my composition as an anti-fouling paint, I prefer, however, to insure against the adhesion of such marine life, to add a toxic such as those which have been heretofore used in anti-fouling paints, or others, but in greatly reduced proportions. I prefer to use such toxics as are water soluble, for the reason that the emulsion formed by the lanolin and water absorbed by the composition becomes more readily impregnated with the toxic, and is absorbed by the marine life which attempts to adhere to the surface coated with my composition. The composition being somewhat yieldable and elastic, the toxic is not permanently bound therein, but is available at the surface at all times for absorption by marine life. As examples of suitable toxics, I may mention metallic toxics such as mercury, copper and arsenic compounds, cyanide compounds, poisonous alkaloids, emodin-bearing drugs, quinine or quinine-bearing drugs, bitter substances such as aloes, picrotoxin, cantharides, aspidium and the like. I have found that as little as one-tenth of one percent by weight of the toxic is often sufficient to prevent undesirable adhesion for long periods, of marine life to a surface coated with my composition and exposed to such life.

I attribute this to the peculiarly efficient distribution of the toxic throughout the composition and its peculiar availability at the surface thereof at all times for imbibing or suction by such life.

The lanolin, as I believe, imparts to the composition the property of indefinitely resisting oxidation, thereby acting as a preservative. It prevents the composition from ever drying out too hard, thereby retaining its elasticity indefinitely and preventing it from becoming brittle. The lanolin absorbs a definite percentage of water, which it distributes with the toxic on subdivision throughout the composition, and after absorbing its water content, than repels moisture.

The lanolin thereby keeps the composition at all times sufficiently moist to prevent loss of elasticity and consequently prevents the composition from becoming brittle. It aids in holding the added pigments in emulsion, and assists in the emulsification of the various ingredients with the water content of the composition. It also permits of the addition of water, if desired, especially if water soluble toxics are to be used.

My composition has the properties of being sufficiently elastic as to greatly decrease the friction of ship bottoms and seaplane pontoons through the water, it dries sufficiently firm to prevent its removal by washing of the water thereagainst, it adheres well to all types of surfaces even though very smooth. It may be applied to wet surfaces. It may be subjected to use immediately after application without waiting for it to dry. It is substantially unaffected by moisture, and is particularly well adapted for the coating of ship bottoms, piles, concrete and stone walls, and under-water machinery or construction subjected to the action of sea water such as condensers, cooling system apparatus and the like, to prevent the adhesion to the surface of barnacles and other animals.

I have found that it is also extremely effective in preventing the rusting of metal and as a preservative of all types of surfaces against the action of the atmosphere, particularly when laden with acrid fumes, and against various weather conditions. For such uses, the toxic may be omitted. It fully protects the surface to which it is applied over long periods, drying as a tough, somewhat yieldable elastic film.

It will be understood that I have described only a few of the uses to which my new composition may be put, that various equivalents as indicated may be used to replace the ingredients specifically described, that the proportions of the ingredients may be varied to a considerable extent without departing from the spirit and scope of this invention, and that I do not intend to be understood as limiting myself to the specific ingredients and proportions above set forth but that I intend to claim my invention as broadly as may be permitted by the state of the prior art and the terms of the appended claims.

I claim:

1. A composition comprising Lincman gum, Mariola gum, caoutchouc, euphorbium coagulum and lanolin.

2. A coating composition including Lincman gum, lanolin, a resin, at least two gums selected from a group consisting of the rubber family and its congeners, and a solvent.

3. A coating composition including lanolin, Lincman gum, a rubber resin, at least two lactiferous plant exudates in the nature of rubber, a pigment, and a solvent.

4. A coating composition including Lincman gum and euphorbium coagulum.

5. A coating composition including substantially equal parts of Lincman gum, Mariola gum, caoutchouc, euphorbium coagulum and lanolin, intimately mixed.

6. A coating composition including substantially equal parts of Lincman gum, Mariola gum, caoutchouc, euphorbium coagulum and lanolin, intimately mixed, and a solvent consisting of carbon tetrachloride, and gas house liquor.

7. A coating composition including Lincman gum, lanolin, a resin obtained from rubber or its congeners, a toxic, a pigment, and a non-inflammable solvent.

8. A coating composition comprising an intimate mixture of equal parts of Lincman gum, Mariola gum, caoutchouc and euphorbium coagulum, powdered and fused together, lanolin, one percent to five percent of a toxic, and a solvent.

9. A composition comprising an intimate mixture of Lincman gum, euphorbium coagulum a gum selected from a group consisting of gutta percha, caoutchouc, balata, guayule and chicle, and a resin obtained from rubber.

10. A composition comprising Lincman gum, a resin obtained from rubber and euphorbium coagulum.

11. A composition containing substantially equal parts of Lincman gum, a resin obtained from rubber, caoutchouc and euphorbium coagulum, all fused together to form an intimate and homogeneous mixture.

12. A composition including gums selected from a group consisting of the euphorbia, gutta percha, caoutchouc, balata and chicle families and their congeners, a rubber resin, lanolin, a pigment and a solvent comprising carbon tetrachloride and gas house liquor.

13. A composition including four different gums selected from a group consisting of the euphorbia, gutta percha, caoutchouc, balata and chicle families and their congeners, a rubber resin lanolin, and a water-soluble toxic.

14. The method of making a water-resisting, anti-corrosive and anti-fouling paint comprising fusing together a rubber resin and gums of the rubber family, adding lanolin to the melt and then adding a solvent comprising carbon tetrachloride and gas house liquor.

15. The method of making an anti-fouling paint comprising melting together a resin and rubber gums, adding lanolin to the compound after it has been fused, and adding a water soluble toxic in the presence of any moisture absorbed by the lanolin to distribute the toxic throughout the paint, and to make it available for absorption by marine life.

16. A coating composition comprising twenty-five parts of Lincman gum, twenty-five parts of Mariola gum, twenty-five parts of caoutchouc, twenty-five parts of euphorbium coagulum, fifteen to thirty-five parts of lanolin, up to 5% of a toxic, a solvent, and a pigment.

JOHN MANO.